United States Patent
LaFrese et al.

(10) Patent No.: US 7,444,478 B2
(45) Date of Patent: Oct. 28, 2008

(54) PRIORITY SCHEME FOR TRANSMITTING BLOCKS OF DATA

(75) Inventors: Lee Charles LaFrese, Tucson, AZ (US); Sonny Earl Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/282,518

(22) Filed: Nov. 18, 2005

(65) Prior Publication Data

US 2007/0118698 A1    May 24, 2007

(51) Int. Cl.
*G06F 12/12* (2006.01)
(52) U.S. Cl. .................. 711/143; 711/135; 711/113
(58) Field of Classification Search ................. 711/141, 711/143, 135, 113
See application file for complete search history.

(56) References Cited

U.S. PATENT DOCUMENTS

| | | | |
|---|---|---|---|
| 5,542,066 A * | 7/1996 | Mattson et al. ............. | 711/136 |
| 5,642,350 A | 6/1997 | Dailey | |
| 6,173,374 B1 | 1/2001 | Heil et al. | |
| 6,732,193 B1 | 5/2004 | Burton et al. | |
| 2002/0013879 A1 * | 1/2002 | Han ........................... | 711/103 |
| 2003/0014534 A1 | 1/2003 | Watanabe et al. | |
| 2003/0212865 A1 * | 11/2003 | Hicken et al. ............... | 711/135 |
| 2003/0217119 A1 | 11/2003 | Raman et al. | |
| 2004/0181640 A1 | 9/2004 | Factor et al. | |
| 2004/0205780 A1 | 10/2004 | Hara et al. | |
| 2005/0071549 A1 * | 3/2005 | Tross et al. ................. | 711/113 |
| 2005/0149638 A1 * | 7/2005 | Maeda et al. ................ | 710/6 |
| 2006/0294301 A1 * | 12/2006 | Zohar et al. ................ | 711/113 |

OTHER PUBLICATIONS

Varma, "Destage Algorithms for Disk Arrays with Nonvolatile Caches," IEEE Transactions on Computers, vol. 47, No. 2, Feb. 1998.*

* cited by examiner

*Primary Examiner*—Matt Kim
*Assistant Examiner*—Hal Schnee
(74) *Attorney, Agent, or Firm*—Janaki K. Davda; Konrad Raynes & Victor LLP (57) ABSTRACT

Provided are techniques for transmitting blocks of data. It is determined whether any high priority out of sync (HPOOS) indicator is set to indicate that a number of modified segments associated with a block of data are less than or equal to a modified segments threshold. In response to determining that at least one high priority out of sync indicator is set, one or more sub-blocks of data in the modified segments associated with the block of data and with one set high priority out of sync indicator are transferred.

8 Claims, 8 Drawing Sheets

Segment 1
310

Sub-Block A of Block of Data 1

Sub-Block E of Block of Data 1

| High Priority Out of Sync (HPOOS) Structure 360 |||
|---|---|---|
| Block of Data 1 550 | Block of Data 2 552 | Block of Data 3 554 |
| • • • | • • • | • • • |
| • • • | • • • | • • • |

PRIORITY SCHEME FOR TRANSMITTING BLOCKS OF DATA

BACKGROUND

1. Field

Embodiments of the invention relate to a priority scheme for transmitting blocks of data.

2. Description of the Related Art

Disaster recovery systems address two types of failures, a sudden catastrophic failure at a single point in time or data loss over a period of time. In the second type of gradual disaster, updates to volumes on data storage may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides several remote mirroring systems, including, for example: an asynchronous Peer-to-Peer Remote Copy (PPRC®) service.

The asynchronous PPRC® service provides a technique for recovering data updates that occur between a last, safe backup and a system failure. Such data shadowing systems can also provide an additional remote copy for non-recovery purposes, such as local access at a remote site.

With the asynchronous PPRC® service, a primary storage subsystem maintains a copy of data on a secondary storage subsystem. Changes to data at the primary storage subsystem are copied to the secondary storage subsystem as an application updates the data at the primary storage subsystem. Thus, the copy may be used whether there are gradual and/or intermittent failures.

Volumes in the primary and secondary storage devices are consistent when all writes have been transferred in their logical order, i.e., all dependent writes transferred first before the writes dependent thereon. In a banking example, this may mean that a deposit is written to the secondary volume before a withdrawal. A consistency group may be described as a collection of related volumes that are kept in a consistent state. A consistency transaction set may be described as a collection of updates to the primary volumes such that dependent writes are secured in a consistent manner. Consistency groups maintain data consistency across volumes. For instance, if a failure occurs, the deposit will be written to the secondary volume before the withdrawal. Thus, when data is recovered from the secondary volumes, the recovered data will be consistent with the data at the primary storage subsystem.

With the asynchronous PPRC® server, if the network bandwidth capability is exceeded for some period of time, the formation of consistency groups may be suspended, an out of synch bitmap that is used to indicate which tracks have been modified since the last transfer to the secondary storage subsystem may have a very large number of bits set, and a Recovery Point Objective (RPO) may grow. An RPO may be described as a value indicating how far behind in time the data at the secondary storage subsystem may be from the primary storage subsystem (e.g., if the RPO is 30 seconds, the secondary storage subsystem is expected to include data that is not more than 30 seconds older than data at the primary storage subsystem).

Cache residency time may be described as an average amount of time in which data remains in cache before being flushed out of cache. If the RPO exceeds the cache residency time, then data that needs to be sent to the secondary storage subsystem may be eliminated from cache at the primary storage subsystem before that data is transferred. If this happens, when the data is eventually sent to the secondary storage subsystem from the primary storage subsystem, full tracks are staged from primary storage (i.e., copied from disk to cache) and transmitted across the network.

For an application doing sequential writes, typically entire tracks are transferred, so having to stage tracks for transfer does not reduce efficiency. For such cases, staging and transferring tracks adds to disk utilization (i.e., the disks are accessed more), but not to network utilization (i.e., because full tracks are typically sent for such cases).

If the application is doing an appreciable quantity of small random writes to data. (e.g., 4 Kilobytes (KB) of data), eliminating these data changes from cache causes full tracks (e.g., 54 KB for count key data, which is formatted for certain mainframe computers, or 32 KB or 64 KB for fixed block data, which is formatted for certain other computers) to be transmitted across the network instead of the updated data (e.g., 4 KB of data). This reduces the efficiency of network usage and elongates the time that it takes to recover from a write burst. A write burst refers to writing of a sequence of data counted as one unit in accordance with some specific criterion or measure. A write operation may update data, write new data, or write the same data again.

Thus, there is a need in the art for a priority scheme for transmitting blocks of data.

SUMMARY OF EMBODIMENTS OF THE INVENTION

Provided are a method, computer program product, and system for transmitting blocks of data. It is determined whether any high priority out of sync (HPOOS) indicator is set to indicate that a number of modified segments associated with a block of data are less than or equal to a modified segments threshold. In response to determining that at least one high priority out of sync indicator is set, one or more sub-blocks of data in the modified segments associated with the block of data and with one set high priority out of sync indicator are transferred.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

With embodiments, a priority scheme is used so that small blocks of modified data are preferentially transmitted over a network from a primary control unit to a secondary control unit using an asynchronous service (e.g., asynchronous PPRC®). Embodiments avoid instances in which full tracks are staged from primary storage and transmitted, instead of transmitting the small blocks.

Figure 1:
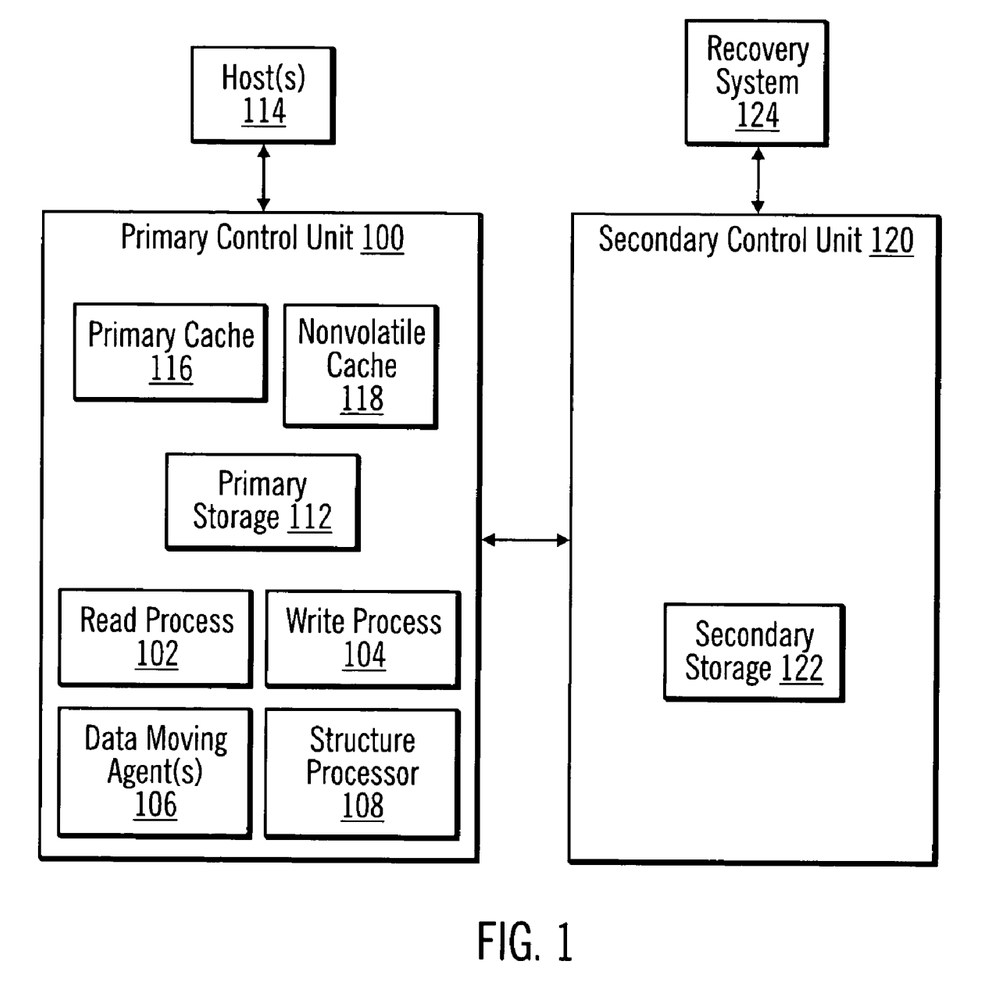
FIG. 1 illustrates details of a computing environment in accordance with certain embodiments.

FIG. 1 illustrates details of a computing environment in accordance with certain embodiments. A primary control unit 100 provides one or more hosts 114 access to primary storage 112.

The primary storage 112 may be divided into blocks of storage containing blocks of data. In certain embodiments, the blocks of data are contents of tracks, while the sub-blocks of data are contents of sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

The primary control unit 100 includes a primary cache 116 in which updates to blocks of data in the primary storage 112 are maintained until written to primary storage 112 (i.e., the blocks of data are destaged). Additionally, the primary control unit 100 includes a nonvolatile cache 118. The nonvolatile cache 118 may be, for example, a battery-backed up volatile memory, to maintain a non-volatile copy of data updates.

The primary control unit 100 includes a read process 102 for reading data, and a write process 104 for writing data. The primary control unit 100 also includes one or more data moving agents 106 for transferring data from the primary control unit 100 to remote storage, such as storage at the secondary control unit 120. In certain embodiments, the data moving agents 106 transfer data from the primary control unit 100 to the secondary control unit 120 asynchronously. The primary control unit 100 includes a structure processor 108 that maintains (e.g., updates or reads) certain structures (e.g., structures 350, 360 of FIG. 3), dispatches agents (e.g., data moving agents 106), and updates primary cache 116. The structure processor 108 may be microcode or firmware.

Secondary control unit 120 provides one or more recovery systems 124 access to secondary storage 122, which maintains back-up copies of all or a subset of the volumes of the primary storage 112. Secondary storage 122 is also divided into blocks of storage containing blocks of data, and the blocks of storage are further divided into sub-blocks of storage that contain sub-blocks of data. In certain embodiments, the blocks of data are tracks, while the sub-blocks of data are sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

In certain embodiments, removable storage (instead of or in addition to remote storage, such as secondary storage 122) may be used to maintain back-up copies of all or a subset of the primary storage 112, and the embodiments of the invention transfer data to the removable storage rather than to the remote storage. The removable storage may be coupled to the primary control unit 100.

In certain embodiments, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, recovery systems, and secondary storage.

In certain embodiments, primary storage 112 and secondary storage 122 may be Direct Access Storage Device (DASD).

In certain embodiments, the primary control unit 100 and secondary control unit 120 may be coupled via a network, which may comprise any type of network, such as, for example, a Storage Area Network (SAN), a Local Area Network (LAN), Wide Area Network (WAN), the Internet, an Intranet, etc.

In certain embodiments, the primary control unit 100 and secondary control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

In certain embodiments, data is maintained in volume pairs. A volume pair is comprised of a volume in a primary storage device (e.g., primary storage 112) and a corresponding volume in a secondary storage device (e.g., secondary storage 122) that includes a consistent copy of the data maintained in the primary volume. For example, primary storage 112 may include Volume 1 and Volume 2, and secondary storage 122 may contain corresponding Volume 1 and Volume 2.

Initially, host 114 writes data to a track in primary cache 116. Write operations modify the track in primary cache 116, and primary cache 116 content is written to primary storage 112. Subsequently, primary cache 116 content is asynchronously written to primary storage 112. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. Copying all or a portion of a track from primary storage 112 to primary cache 116 is referred to as a staging operation.

Figure 2:
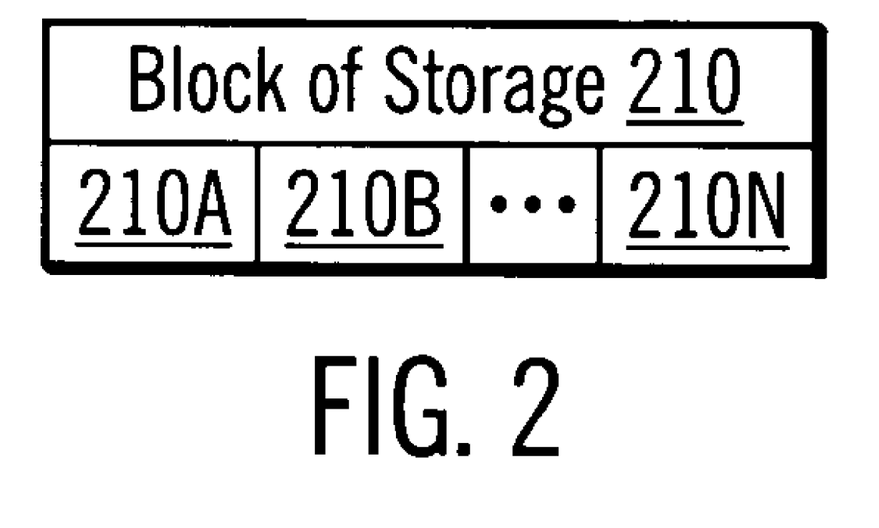
FIG. 2 illustrates a block of storage in accordance with certain embodiments.

FIG. 2 illustrates a block of storage in accordance with certain embodiments. A block of storage 210 contains blocks of data and is further subdivided into sub-blocks of storage 210A, 210B, . . . 210N (210A-210N, where N may be any number) that store sub-blocks of data.

Figure 3:
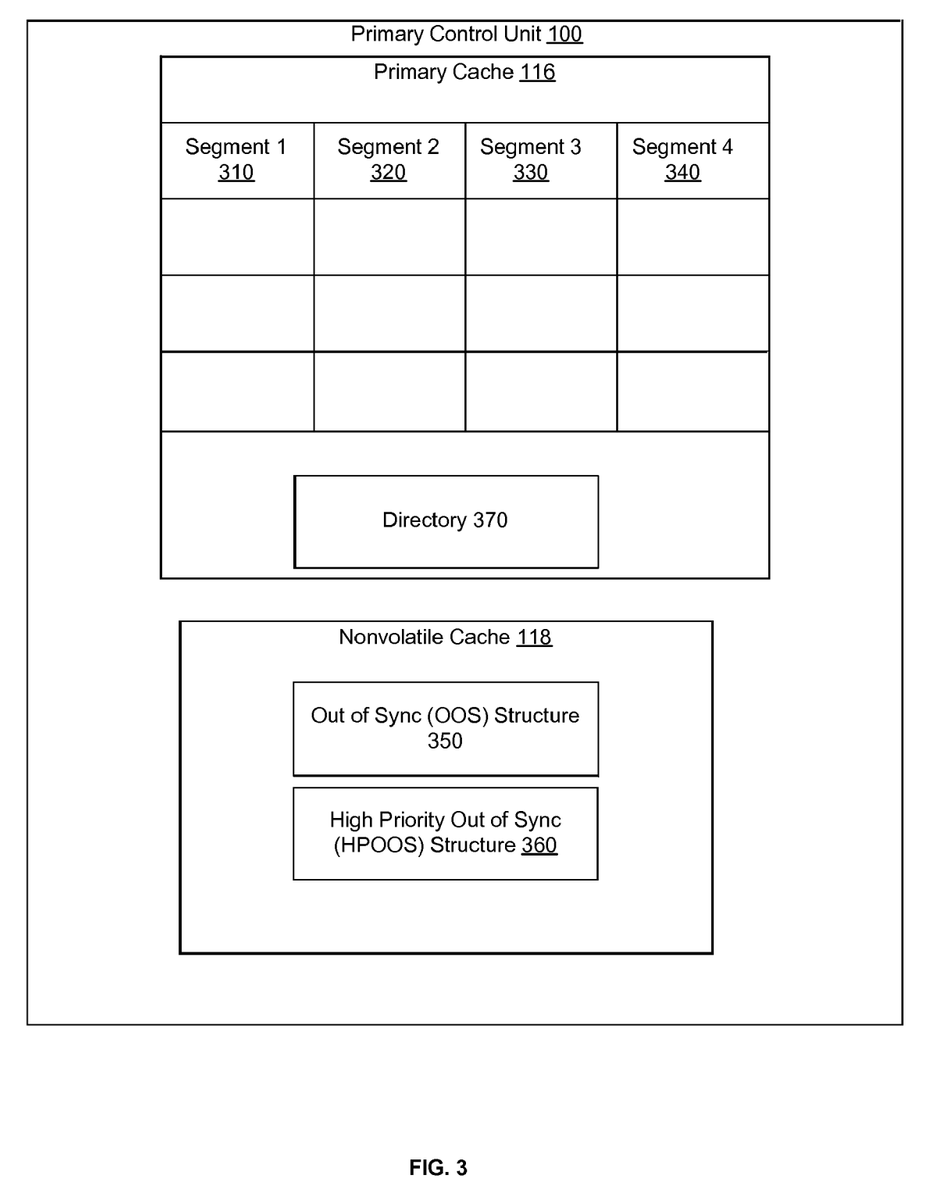
FIG. 3 illustrates further details of caches in accordance with certain embodiments.
Figure 4:
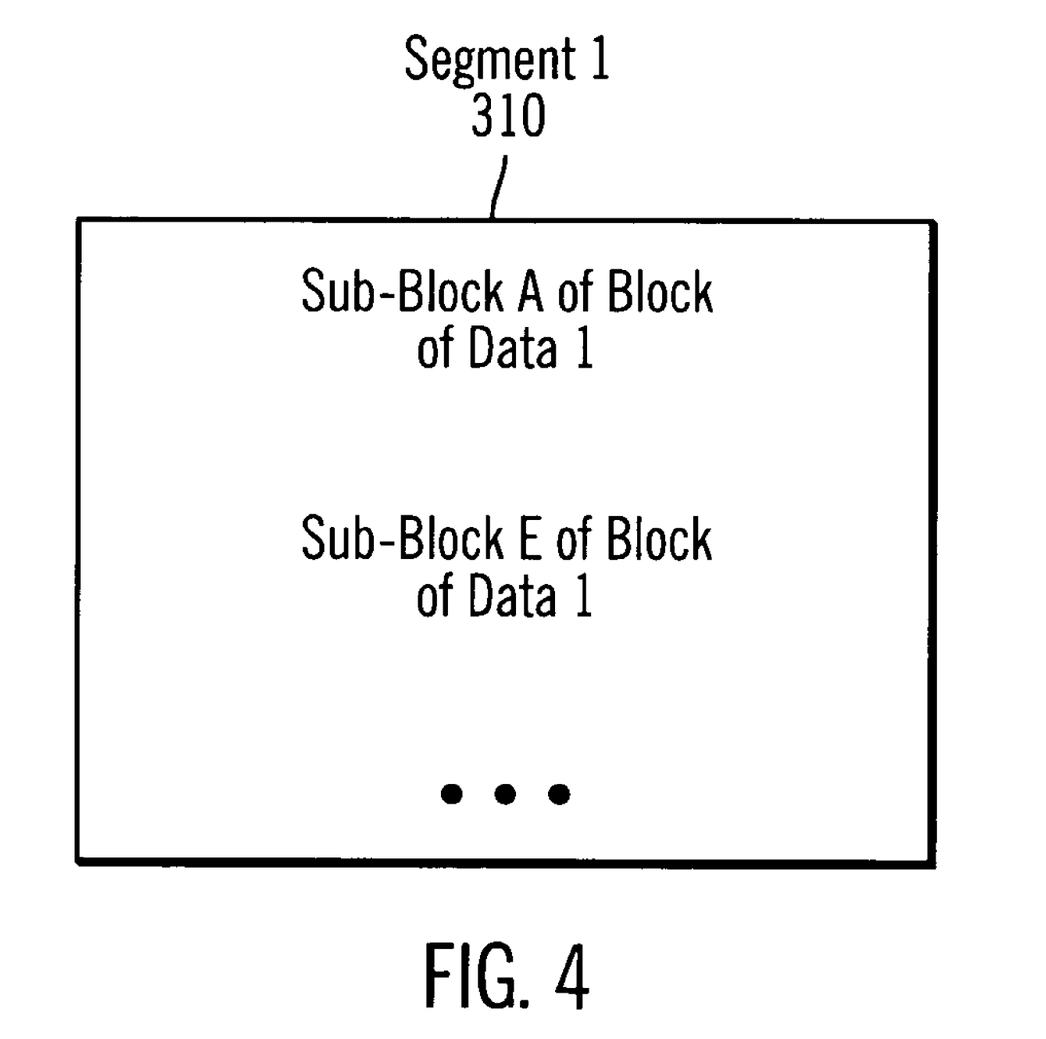
FIG. 4 illustrates further details of a segment in a primary cache in accordance with certain embodiments.

FIG. 3 illustrates further details of caches 116 and 118 in accordance with certain embodiments. Primary cache 116 includes segments for storing data and a directory 370. In particular, a portion of primary cache 116 is partitioned into segments (e.g., 310, 320, 330, 340). Each segment may store one or more sub-blocks of data. FIG. 4 illustrates further details of a segment in primary cache 116 in accordance with certain embodiments. Segment 1 310 stores sub-block A of block of data 1 and sub-block E of block of data 1. Sub-blocks A and E are modified sub-blocks of block of data 1. In certain embodiments, a segment stores 4K of data, and a sub-block of data uses 512 bytes of storage.

When accessing a block of data, the directory 370 is used to determine whether the block of data is in primary cache 116. If the block of data is in the primary cache 116, the directory 370 includes an entry indicating the location of the block of data. If the block of data is not in the primary cache 116, the directory 370 does not include an entry for that block of data, and the block of data is promoted. When a block of data has been demoted, the entry in the directory 370 for the demoted block of data is removed.

Nonvolatile cache 118 includes an out of sync (OOS) structure 350 (e.g., a bitmap) and a high priority out of sync (HPOOS) structure 360 (e.g., a bitmap). In certain alternative embodiments, the HPOOS structure 360 is stored in the primary cache 116.

The out of sync structure 350 is used to determine which blocks of data have been modified since the last transfer to the secondary control unit 120, without regard to the particular modified sub-blocks of data of the block of data. The out of sync structure 350 includes an out of sync (OOS) indicator (e.g., bit) for each block of data, which indicates whether any portion of the block of data has been modified since the last time the block of data was copied to the secondary control unit 120. In certain embodiments, there is one out of sync structure 350 for each volume on primary storage 112. In certain embodiments, the out of sync structure 350 resides in volatile cache, such as primary cache 116, with a copy on primary storage 112, and only changes to the out of sync structure 350 are stored in nonvolatile cache 118. When the time to transfer the block of data to the secondary control unit 120 comes, a block of data with a set OOS indicator is sent in its entirety, even if only one sub-block of data (e.g., less than 1% of the data volume) of the block of data has been modified.

Figure 5:
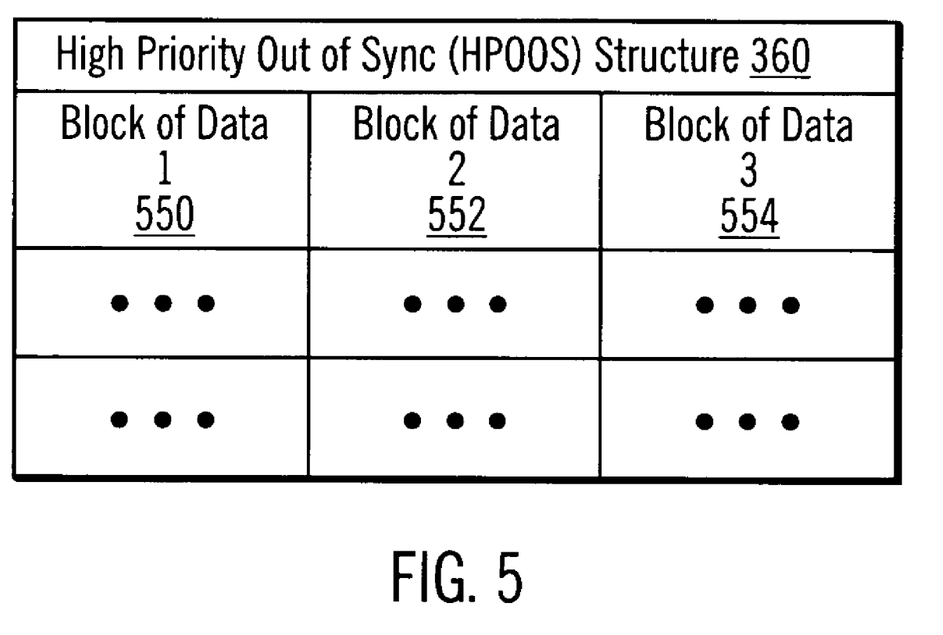
FIG. 5 illustrates further details of the High Priority Out of Sync (HPOOS) structure in accordance with certain embodiments of the invention.

FIG. 5 illustrates further details of the HPOOS structure 360 in accordance with certain embodiments of the invention. Embodiments provide the HPOOS structure 360 for high priority work. For each block of data 550-554 (e.g., track), the HPOOS structure 360 includes an indicator (referred to as an HPOOS indicator) that indicates whether the modified segments associated with that block of data are less than or equal to a modified segments threshold. A modified segment may be described as a segment in primary cache 116 that includes at least one modified sub-block of data. The modified segments threshold may be determined by experimentation or may be set by a user (e.g., a system administrator). In certain embodiments, the modified segments threshold is three. As an example, if the modified segments threshold is three, and, if at most three segments (e.g., 320, 330, and 340) contain modified sub-blocks for a block of data, then the indicator for the block of data is set in the HPOOS structure 360 to indicate that the modified segments associated with that block of data are less than or equal to the modified segments threshold. Because each segment may store one or more sub-blocks of data, the number of modified sub-blocks of data may be greater than the modified segments threshold even if the number of modified segments is smaller than or equal to the modified segments threshold.

Figure 6:
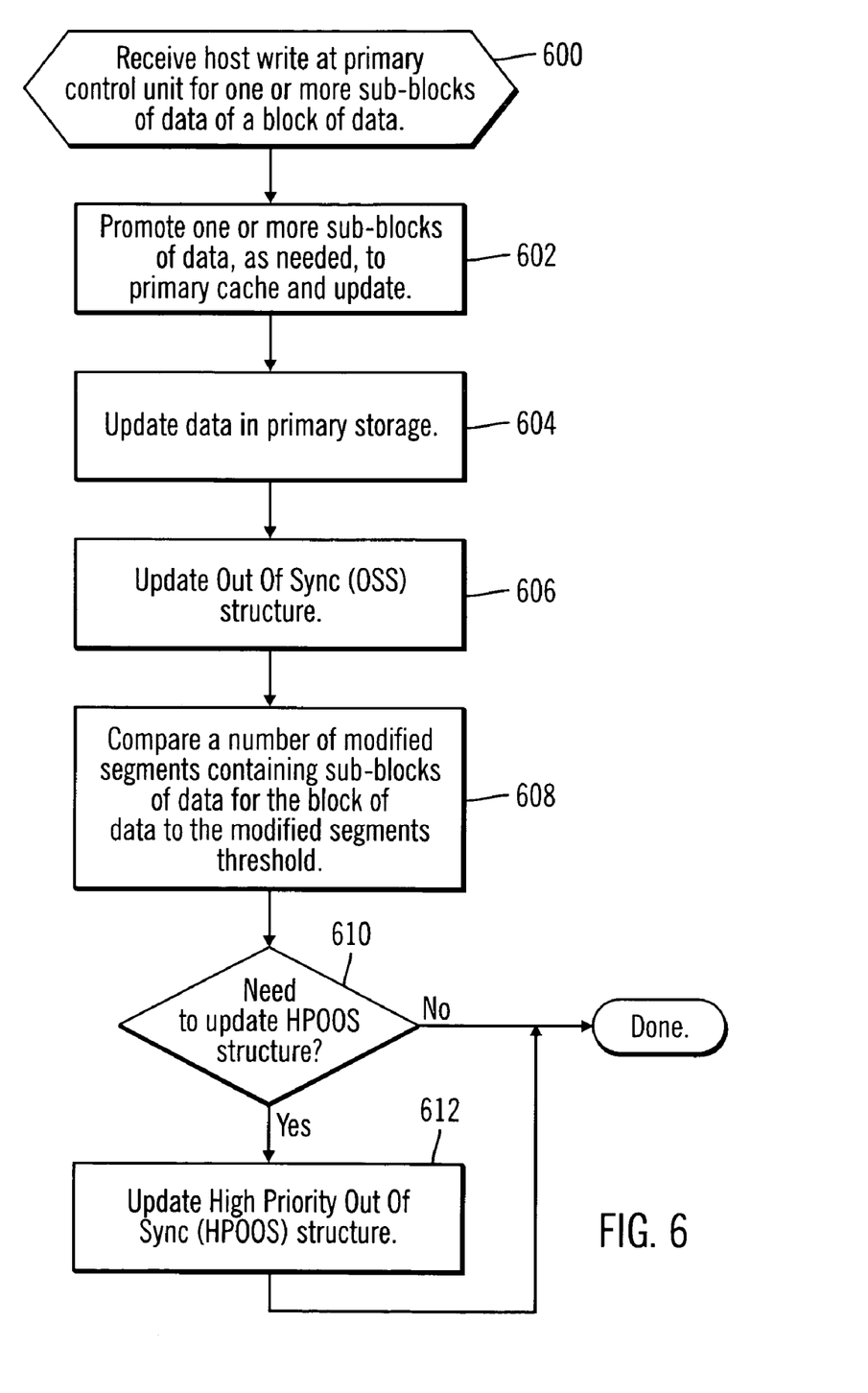
FIG. 6 illustrates logic for writing data in accordance with certain embodiments.

FIG. 6 illustrates logic for writing data in accordance with certain embodiments. Control begins at block 600 with the primary control unit 100 receiving a host write from host 114 for one or more sub-blocks of data of a block of data. The write may update data, write new data, or write the same data again. In block 602, the structure processor 108 promotes one or more sub-blocks of data to primary cache 116, as needed, and updates the promoted one or more sub-blocks of data. In block 604, the structure processor 108 stores the updated data in primary storage 112. In block 606, the structure processor 108 updates the out of sync structure 350 to set an indicator associated with the block of data including the sub-blocks of data for which the write was received, wherein the indicator indicates that the block of data is to be transferred to the secondary control unit 120.

In block 608, the structure processor 108 compares a number of modified segments containing sub-blocks of data for the block of data to the modified segments threshold. In block 610, the structure processor 108 determines whether the high priority out of sync structure 360 is to be updated. If so, processing continues to block 612, otherwise, processing is done. In block 612, the structure processor 108 updates the high priority out of sync structure 360. In particular, because sub-blocks of data that are to be modified by the host write are stored in segments in primary cache 116, when a host write is received, for the block of data impacted by the host write, a number of modified segments containing sub-blocks of data for that block of data is compared to the modified segments threshold. If the number of modified segments is equal to or less than the modified segments threshold, then the high priority out of sync indicator is set for the block of data. If the number of modified segments is greater than the modified segments threshold, then the high priority out of sync indicator is reset.

The data moving agents 106 review the OOS structure 350 and the HPOOS structure 360 and transfer data. In certain embodiments, the HPOOS structure 360 is processed in a higher priority basis. For example, more data moving agents 106 may be assigned to process the HPOOS structure 360, while fewer data moving agents 106 may be assigned to process the OOS structure 350. In this manner, when there is a large amount of data (i.e., blocks of data and/or sub-blocks of data) to be transferred, the blocks of data with fewer modified sub-blocks of data are more likely to be transmitted before being flushed out of the primary cache 116.

Figure 7:
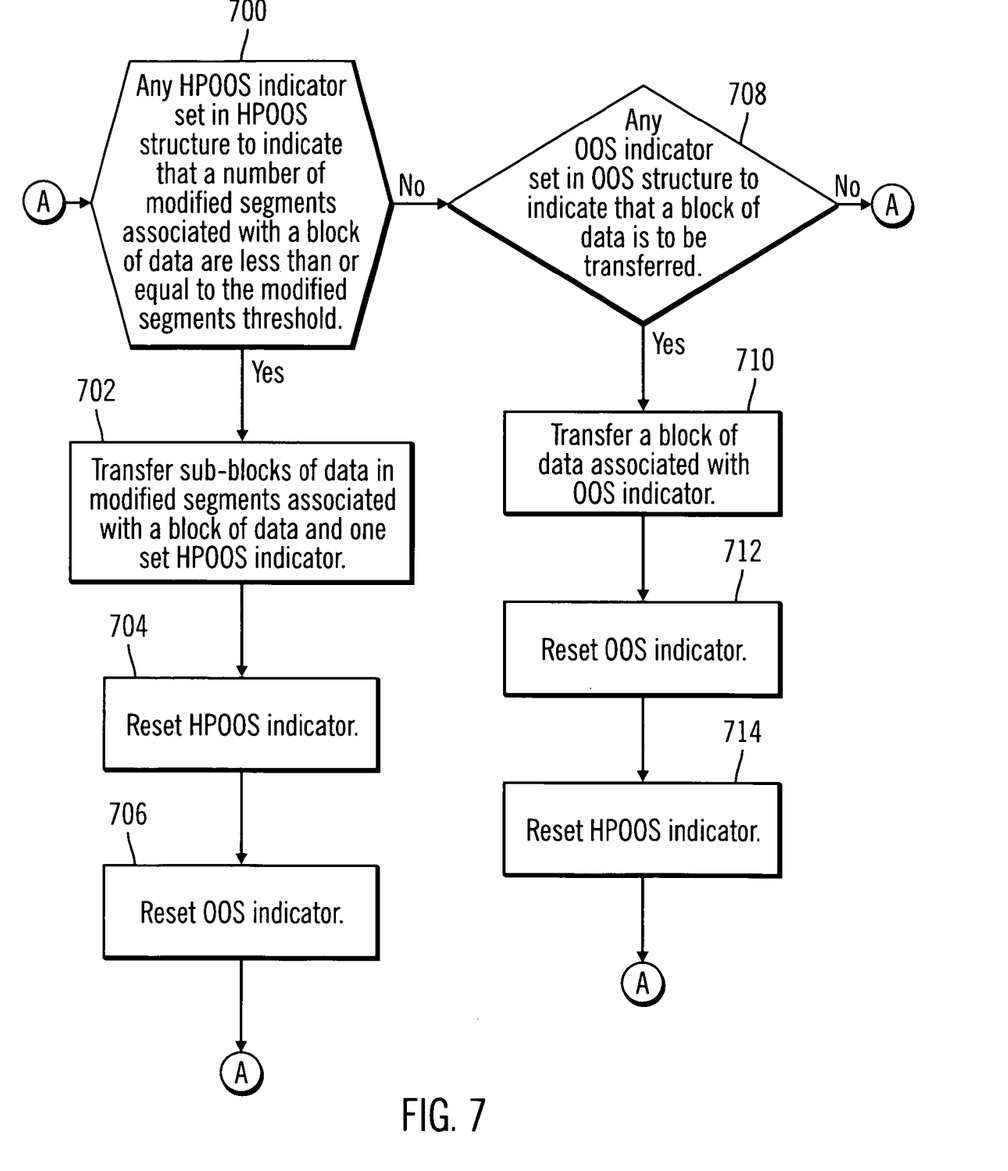
FIG. 7 illustrates processing performed by a data moving agent in accordance with certain embodiments.

FIG. 7 illustrates processing performed by a data moving agent 106 in accordance with certain embodiments. Control begins at block 700 with a data moving agent 106 determining whether any HPOOS indicator is set in the HPOOS structure 360 to indicate that a number of modified segments associated with a block of data are less than or equal to the modified segments threshold. If so, processing continues to block 702, otherwise, processing continues to block 708. In certain alternative embodiments, rather than continuing to block 708, the processing may wait for an HPOOS indicator to be changed and process that indicator.

In block 702, the data moving agent 106 transfers the sub-blocks of data in the modified segments associated with a block of data and one set HPOOS indicator from primary cache 116 to the secondary control unit 120. When multiple HPOOS indicators are set, one may be selected using various factors (e.g., sequential selection, selection based on number of modified segments associated with each set HPOOS indicator, etc.). In block 704, the data moving agent 106 resets the HPOOS indicator in the HPOOS structure 360 to indicate that there are no modified segments associated with the block of data. In block 706, the data moving agent resets the OOS indicator for the block of data for which the sub-blocks of data have been transferred to indicate that there are no modified sub-blocks of data that are waiting to be transferred for that block of data. From block 706, processing continues to block 700.

If there are no HPOOS indicators set, then the data moving agent may process an OOS structure 350. In block 708, the data moving agent 106 determines whether any OOS indicator is set in the OOS structure 350 to indicate that a block of data is to be transferred. If so, processing continues to block 710, otherwise, processing continues to block 700. In block 710, the data moving agent 106 transfers the block of data associated with one OOS indicator. In block 712, the data moving agent 106 resets the OOS indicator for the block of data for which the sub-blocks of data have been transferred to indicate that there are no modified sub-blocks of data for that block of data. In block 714, the data moving agent 106 resets the HPOOS indicator in the HPOOS structure 360 to indicate that there are no modified segments associated with the block of data.

Thus, embodiments give higher priority to transmitting small block writes across the network than large block writes when using an asynchronous service. Embodiments reduce the likelihood that blocks of data (e.g., full tracks of data) are transmitted across a network when a few sub-blocks of data (e.g., a few sectors) have been updated.

Moreover, embodiments improve network efficiency for transmitting data and for recovering from a write burst. A theoretical evaluation indicated that network efficiency increased by a factor of 8-12 times with embodiments.

PPRC and ESCON are registered trademarks or common law marks of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Thus, a computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 6 and 7 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 6 and 7 may be implemented in software, hardware, programmable and non-programmable gate array logic or in some combination of hardware, software, or gate array logic.

Figure 8:
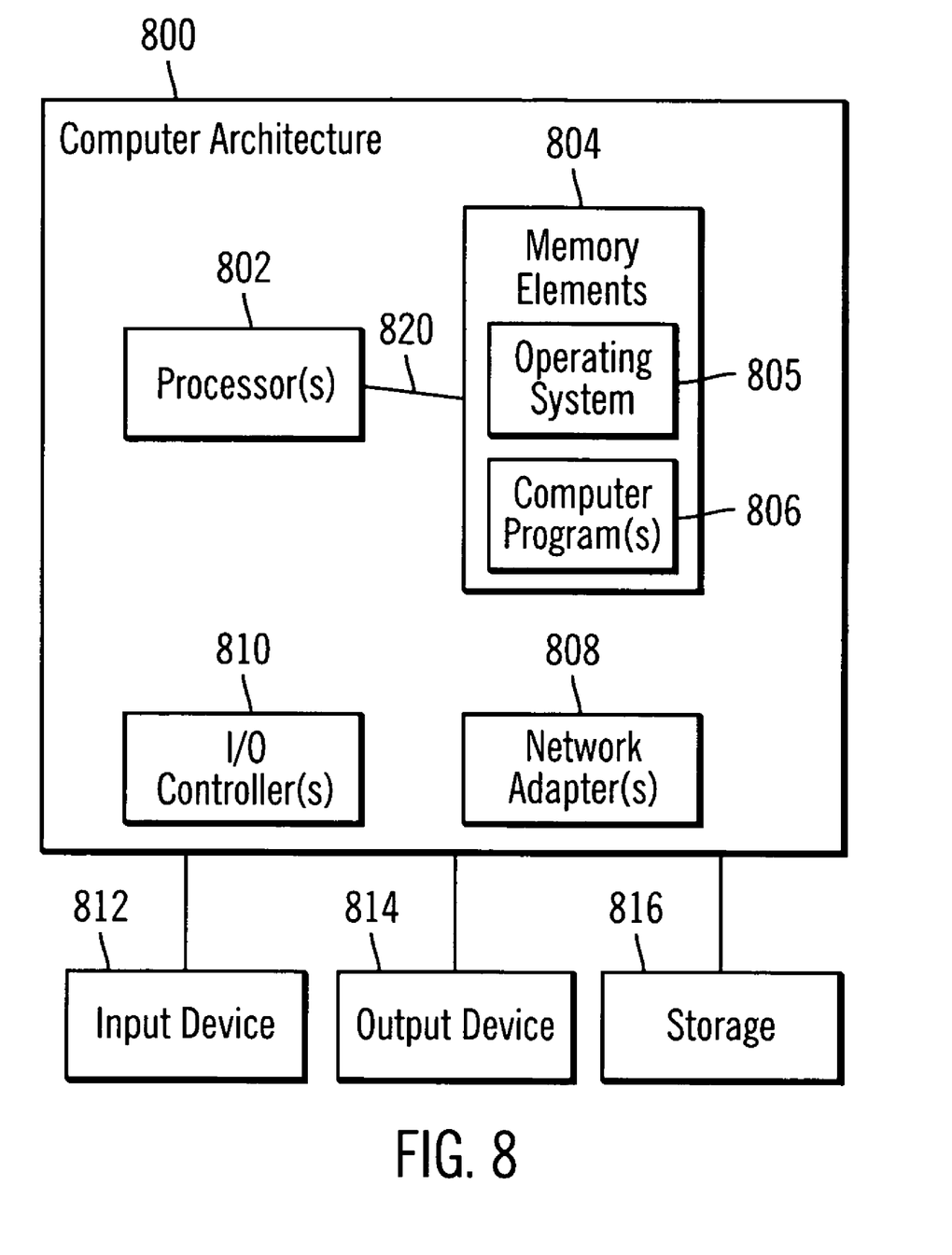
FIG. 8 illustrates a system architecture that may be used in accordance with certain embodiments.

FIG. 8 illustrates a system architecture 800 that may be used in accordance with certain embodiments. Primary control unit 100 and/or secondary control unit 120 may implement system architecture 800. The system architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 may store an operating system 805 and one or more computer programs 806.

Input/output or I/O devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The system architecture 800 may be coupled to storage 816 (e.g., a non-volatile storage area, such as magnetic disk drives, optical disk drives, a tape drive, etc.). The storage 810 may comprise an internal storage device or an attached or network accessible storage. Computer programs 806 in storage 810 may be loaded into the memory elements 804 and executed by a processor 802 in a manner known in the art.

The system architecture 800 may include fewer components than illustrated, additional components not illustrated herein, or some combination of the components illustrated and additional components. The system architecture 800 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for transmitting blocks of data, comprising:
   maintaining high priority out of sync indicators in a high priority out of sync structure, wherein each high priority out of sync indicator is associated with a block of data, wherein a high priority out of sync indicator is set in response to determining that a number of modified segments associated with a block of data is equal to or less than a modified segments threshold, wherein the high priority out of sync indicator is reset in response to determining that the number of modified segments associated with the block of data is greater than the modified segments threshold, wherein the modified segments threshold represents a number of segments that have been modified, and wherein a modified segment is a segment in primary cache that includes at least one modified sub-block of data for a block of data;
   determining whether any high priority out of sync indicator is set in the high priority out of sync structure to indicate that a number of modified segments associated with a block of data are less than or equal to the modified segments threshold; and
   in response to determining that at least one high priority out of sync indicator is set, transferring one or more sub-blocks of data in the modified segments associated with the block of data and with the at least one set high priority out of sync indicator.

2. The method of claim 1, further comprising: resetting the at least one high priority out of sync indicator to indicate there are no modified segments associated with the block of data.

3. The method of claim 1, further comprising:
   resetting an out of sync indicator for the block of data for which the sub-blocks of data have been transferred to indicate that the block of data does not need to be transferred.

4. The method of claim 1, further comprising: in response to determining that no high priority out of sync indicators are set, determining whether any out of sync indicator is set to indicate that a block of data is to be transferred; and in response to determining that one out of sync indicator is set, transferring the block of data associated with one out of sync indicator.

5. The method of claim 4, further comprising:
   resetting the one out of sync indicator for the block of data to indicate that the block of data does not need to be transferred.

6. The method of claim 4, further comprising:
   resetting a high priority out of sync indicator to indicate there are no modified segments for the block of data associated with the one out of sync indicator.

7. The method of claim 1, further comprising:
   receiving a host write for one or more sub-blocks of data; and
   comparing a number of modified segments containing sub-blocks of data for the block of data to the modified segments threshold.

8. A method for transmitting blocks of data, comprising:
   for each of multiple blocks of data,
   comparing a number of modified segments containing sub-blocks of data for that block of data to a modified segments threshold, wherein the modified segments threshold represents a number of segments that have been modified; and
   in response to determining that the number of modified segments is equal to or less than the modified segments threshold, setting a high priority out of sync indicator for the block of data;
   in response to determining that the number of modified segments is greater than the modified segments threshold, resetting the high priority out of sync indicator for the block of data;
   wherein the one or more sub-blocks of data in the modified segments associated with the block of data are transferred in response to determining that the high priority out of sync indicator is set for the block of data without transferring the block of data.

\* \* \* \* \*